(12) United States Patent
Miorelli

(10) Patent No.: US 6,502,715 B2
(45) Date of Patent: Jan. 7, 2003

(54) DRINKING RECEPTACLE

(76) Inventor: Graciela Miorelli, 2301 Perez, San Antonio, TX (US) 78207

( * ) Notice: Subject to any disclaimer, the term of this patent is extended or adjusted under 35 U.S.C. 154(b) by 0 days.

(21) Appl. No.: 10/005,272

(22) Filed: Dec. 5, 2001

(65) Prior Publication Data

US 2002/0166865 A1 Nov. 14, 2002

Related U.S. Application Data

(63) Continuation-in-part of application No. 09/723,058, filed on May 8, 2001, now abandoned.

(51) Int. Cl.⁷ .............................................. B68D 25/42
(52) U.S. Cl. ........................ 220/719; 220/703; 220/718
(58) Field of Search ................................ 220/719, 716, 220/717, 718, 704, 703, 731, 698, 702

(56) References Cited

U.S. PATENT DOCUMENTS

| | | | | |
|---|---|---|---|---|
| 2,084,084 A | * | 6/1937 | Green | |
| 2,885,108 A | * | 5/1959 | Donoghue | |
| 3,184,126 A | * | 5/1965 | Casull | 222/487 |
| 3,313,447 A | * | 4/1967 | Spencer | 220/719 |
| 3,360,161 A | * | 12/1967 | Smith | 220/719 |
| 3,744,671 A | * | 7/1973 | Saunders, Jr. | |
| 3,785,794 A | * | 1/1974 | Hodges | 65/108 |
| 4,130,215 A | | 12/1978 | Corey et al. | |
| 4,726,487 A | * | 2/1988 | Mitri | 220/718 |
| 4,938,375 A | | 7/1990 | Fantacone | |
| 4,964,527 A | * | 10/1990 | Martin | |
| 5,253,780 A | * | 10/1993 | Adado | 220/711 |
| 5,515,998 A | | 5/1996 | Wang | |
| 5,553,731 A | | 9/1996 | Schuyler | |
| 5,845,807 A | | 12/1998 | De Villiers | |
| 6,189,725 B1 | * | 2/2001 | Monico | |
| 6,202,877 B1 | * | 3/2001 | La Torre et al. | 220/254.1 |

* cited by examiner

*Primary Examiner*—Joseph M. Moy
(74) *Attorney, Agent, or Firm*—Jackson Walker L.L.P.; Richard R. Ruble

(57) ABSTRACT

A drinking receptacle for liquids and frozen food products has an interior, vertical, annular ridge with notches. Liquid from the interior chamber of the receptacle or from dripping of the frozen food product are collected in an annular channel formed between the ridge and an outwardly sloping rim. The notches in the ridge allow liquid to pass from or into the interior chamber of the receptacle.

8 Claims, 3 Drawing Sheets

DRINKING RECEPTACLE

This is a continuation-in-part application of application Ser. No. 09/723,058, filed May 8, 2001 now abandoned.

BACKGROUND OF THE INVENTION

The present invention relates to a drinking receptacle. More particularly, the present invention is a cup intended to reduce or eliminate spillage of liquid from around a frozen food retained within the rim of the receptacle.

The prior art is replete with drinking cups and accessories which reduce the tendency of the cup to spill liquid. A well known apparatus is the use of a thin plastic lid or cap to close the top of the receptacle. To enable the withdrawal of the liquid contents from capped receptacles it is necessary to provide a straw opening. These prior art devices are principally designed to retain ice and liquid within the body of the container.

There are far fewer receptacles designed to support a frozen food product such as a snow cone, an ice cream scoop, a frozen ice pop, or ice cream bar. U.S. Pat. No. 5,515,998 discloses a frozen confection holder and receptacle designed to hold the frozen confection in an upright position while being eaten, or while awaiting consumption. A trough-like upper dish is provided with a slot to maintain the stick of the frozen confection in an upright position. There is no teaching in U.S. Pat. No. 5,515,998 for catching drips from any frozen product not supported on a stick. Further, there is no teaching or disclosure of a structure to allow the receptacle to be tilted to facilitate drinking liquids from the upper lip of the receptacle.

The present invention allows for a convenience store to maintain one style of drinking receptacle which functions both to dispense liquids such as soft drinks, water, and coffee, and also be capable of supporting a frozen food product while directing melting drips from the product back into the liquid containment chamber. In the present invention a standard lid may be utilized where desired because the outside diameter of the rim of the present invention may be sized to conventional standards. The vertical, annular support ridge of the present invention within the rim is positioned below the uppermost edge of the rim and, therefore, does not interfere with a standard lid.

The present invention is a significant improvement in the art and solves long-standing standardization of materials problems common in the food and beverage dispensing industry. The receptacle of the present invention may be constructed from any of the standard material compositions used in the industry.

SUMMARY OF THE INVENTION

The present invention is a receptacle which may function as a drinking cup or as a frozen food product drip catcher. A cylindrical cup is provided with an outwardly sloping rim and an interior, vertical annular ridge. The ridge has liquid draining notches which allow liquid to communicate with the space between the rim and the ridge and the interior liquid containment chamber.

The ridge is disposed such that its uppermost edge is below the uppermost edge of the outwardly sloping rim. This allows the receptacle to accept a standard lid for closing the open top of the receptacle.

When a frozen food product such as a snow cone is placed in the receptacle, the product is supported on the interior, annular ridge while the outwardly sloping rim may catch drips from the melting product. The flowable drips are then directed through the notches in the ridge into the interior liquid containment chamber. This feature allows the consumer to avoid messy drips on his/her hands and/or clothes.

DETAILED DESCRIPTION OF THE PREFERRED EMBODIMENT

Figure 1:
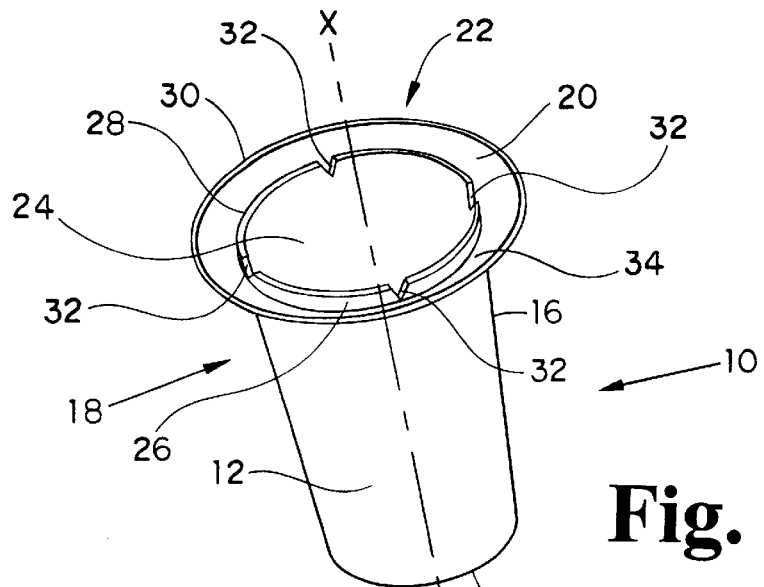
FIG. 1 illustrates a top front perspective view of the present invention.

FIG. 1 shows a perspective view of the receptacle 10 of the present invention. A generally cylindrical cup 12 has a bottom 14 and upwardly extending side walls 16. The side walls extend from the bottom 14 to a top section 18. The top section 18 has an outwardly sloping rim 20 surrounding the open top 22 of the receptacle. A central, vertical axis X extends from the bottom 18 through an interior, liquid containment chamber 24 of the receptacle 10.

An interior, vertical, annular ridge 26 extends above the liquid containment chamber 24. The ridge 26 is integral with the side wall structure 16 at the top section 18. As may be seen from FIG. 1, the ridge 26 is generally parallel to the vertical axis X. The uppermost edge 28 of ridge 26 terminates below the uppermost edge 30 of the rim 20.

One or more notches 32 are formed in the ridge 26 to allow liquid to flow in the channel 34 into and out of the liquid containment chamber 24 as will be described more fully below. The notches 32 may be as few as one or as many as necessary to ensure that liquid in the channel 34 can pass back into the chamber 24.

Figure 2:
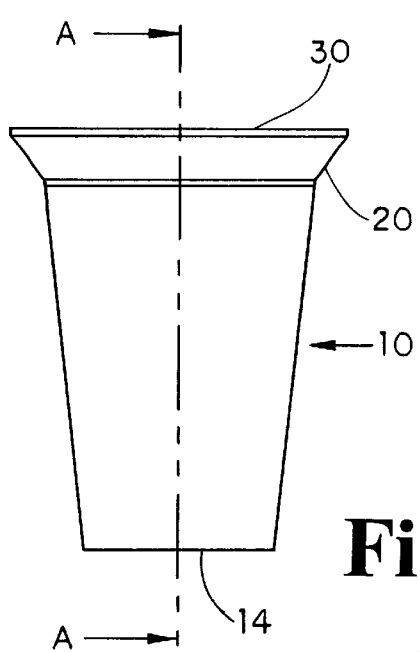
FIG. 2 is a side elevation view of the present invention.
Figure 3:
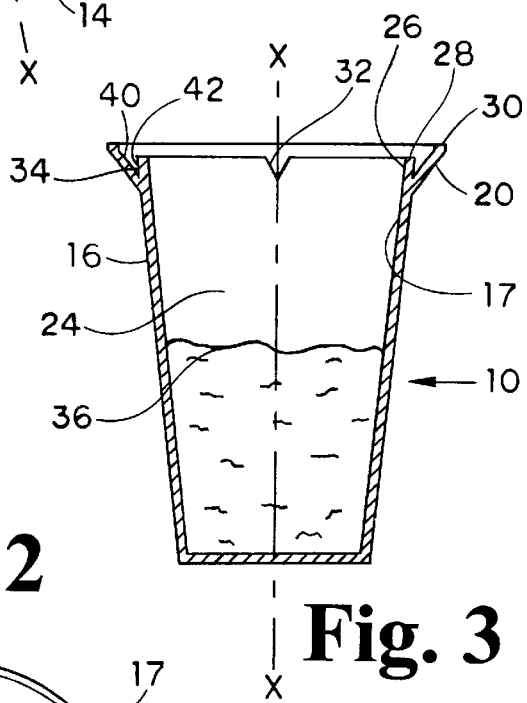
FIG. 3 is a cross section view taken along lines A—A of FIG. 2.

Turning now to FIGS. 2 and 3, the present invention may be seen in a side elevation view. The receptacle 10 from outward appearances looks like a standard drinking cup. The cup may be made of paper, plastic, styrofoam, waxed paper, and the like. Thus, any conventional composition may be used which meets the economic and manufacturing requirements of the producer. The receptacle 10 may accommodate any standard lid (not shown) which might otherwise be used with conventional drinking cups.

FIG. 3 illustrates a cross section view of the present invention taken along line A—A of FIG. 2. It may be seen that the ridge 26 is generally parallel to the central axis X of the receptacle 10. The uppermost edge 28 of ridge 26 is approximately one-quarter inch below the uppermost edge 30 of the sloping rim 20. The rim is angled at approximately 45° outwardly from the central axis X.

Figure 5:
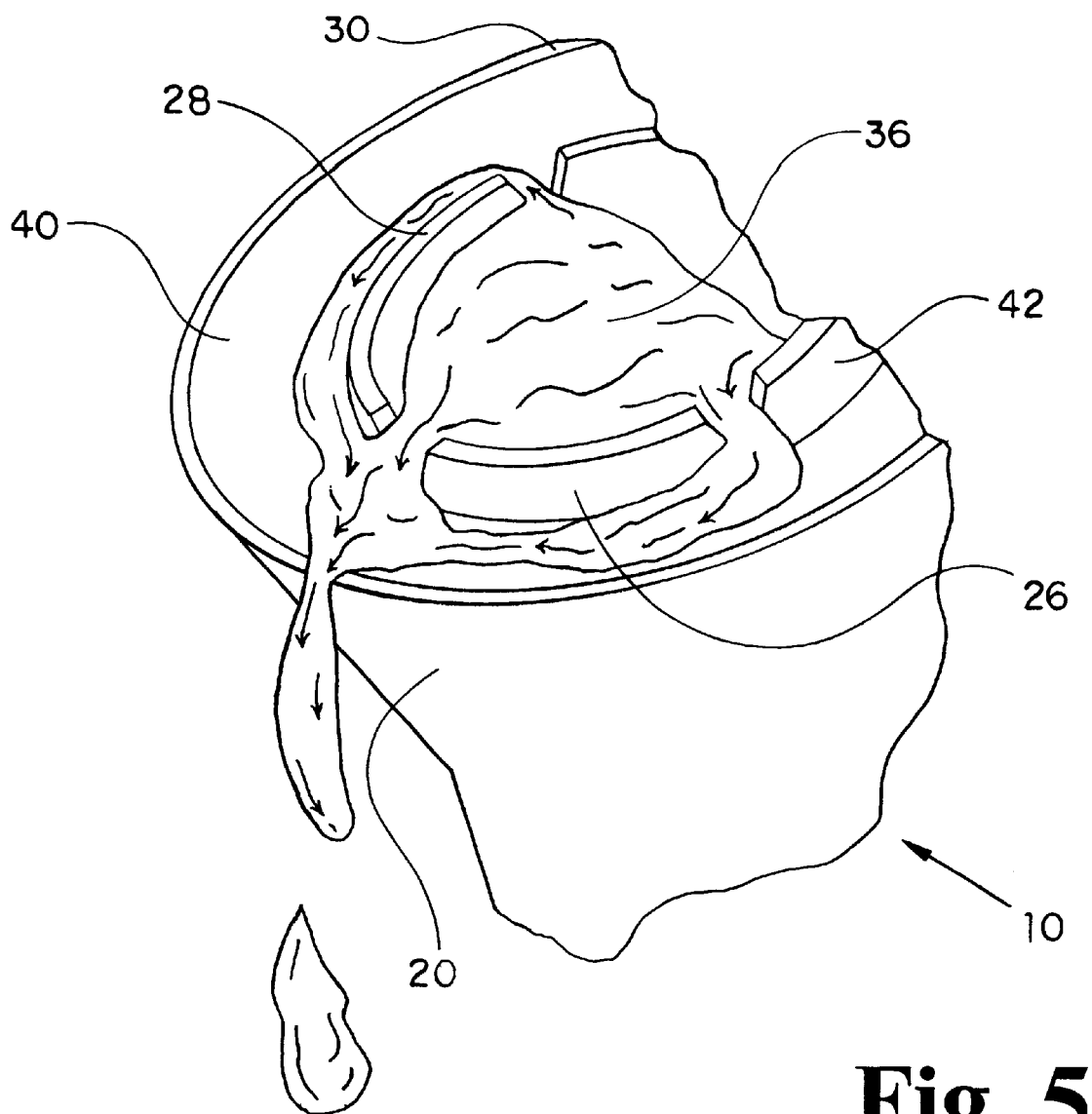
FIG. 5 is a partial perspective view of the present invention illustrating the flow of liquid through the notches in the ridge to the rim and over the rim edge.

When the receptacle 10 is tilted, as will be shown below, liquid may accumulate in the channel 34 formed between the inner side 40 of the rim 20 and the outer side 42 of the ridge 26. If the receptacle 10 contains a liquid such as coffee, the tilting of the receptacle will allow hot liquid to flow in the channel 34. This is seen in FIG. 5. Thus, a small portion of the liquid 36 contained in chamber 24 is allowed to enter the channel 34 for cooling, for example, before being withdrawn from the receptacle by the drinker. Further, when the receptacle is straightened the liquid 36 can drain back into the chamber 24. This cooling effect on the liquid 36 is similar to that achieved when coffee drinkers pour coffee into the support saucer before drinking the hot liquid.

The ridge 26 is shown in FIG. 3 as being formed integral with the side wall 16. However, it should be understood that a separate ring could be fused to the inner surface 17 of the side wall 16 to create the upwardly extending ridge 26.

Figure 4:
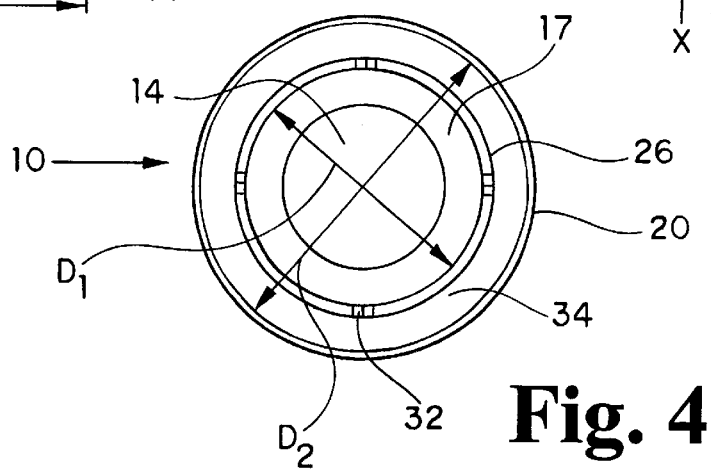
FIG. 4 is a top plan view of the present invention.

FIG. 4 is a simple illustration showing the top plan view of the present invention 10. The bottom 14 can be seen with inner side wall surface 17. Again, it should be understood that the side wall 16 does not have to taper and may be generally straight. However, rim 20 is outwardly sloping and ridge 26 is generally parallel to the central axis X. This creates the channel 34 for draining liquids into or out of the chamber 24.

Figure 6:
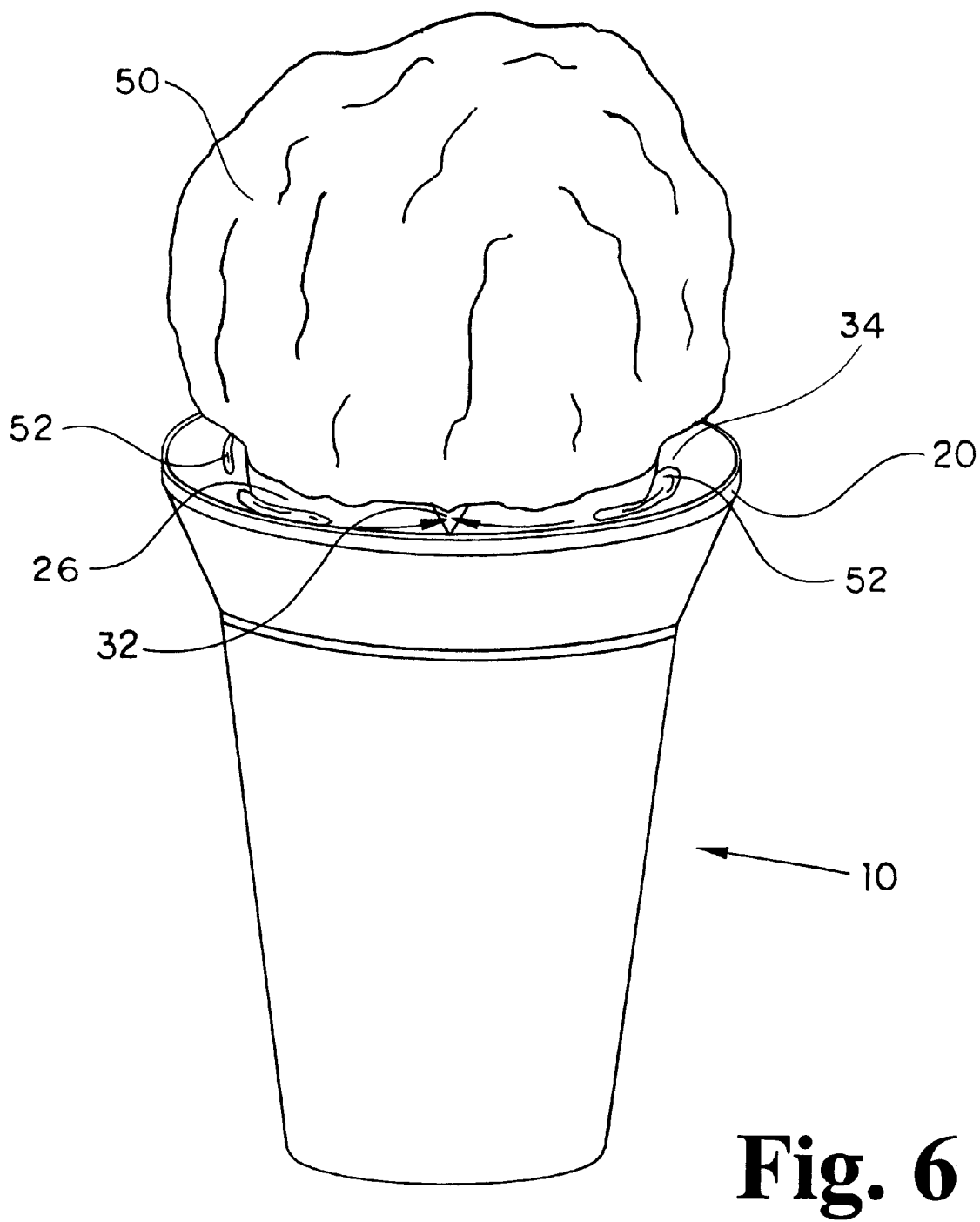
FIG. 6 is a perspective view of the present invention supporting a melting frozen food product on the ridge of the present invention with flowable dripping liquid passing through the notches back into the liquid containment chamber.

FIG. 6 shows the present invention receptacle 10 being utilized to support a frozen food product 50. The product 50 is suspended above the containment chamber 24 by the ridge 26. As the product melts, drips 52 of flowable liquid are collected in channel 34 and directed through notches 32 into the liquid containment chamber 24. In this manner, the user avoids the mess of drip 52 getting on his/her hands and/or clothing.

Certain alternative features of the present invention include the use of notches 32 in the four quadrants of the rim as shown in FIGS. 1 and 4. The diameter $D_1$ of the ridge 26 is less than the diameter $D_2$ of the sloping rim thereby forming the channel 34. While V-shaped notches are shown in the drawings, it should be understood that any effective cut or hole which allows the drip 52 or liquid 36 to pass from the channel 34 to and from the chamber 24 is within the scope of the present invention.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A drinking receptacle for liquids comprising:

a generally cylindrical cup having a bottom and side wall structure extending upwardly from said bottom to a top section including an outwardly sloping rim surrounding an open top of said cup, said cup having a central vertical axis extending from said bottom through an interior liquid containment chamber of said cup; and a vertical, annular ridge interior of said side wall structure at said top section, said ridge generally parallel to said vertical axis, said ridge extending above said interior liquid containment chamber and terminating below an uppermost edge of said outwardly sloping rim, said ridge having at least one drainage notch whereby liquid in said receptacle may pass between said liquid containment chamber and an inner surface of said outwardly sloping rim and an outer surface of said ridge.

2. The receptacle of claim 1 wherein said vertical, annular ridge is adapted for supporting a frozen food product, said product producing flowable liquid drips upon melting, said receptacle further comprising:

a multiplicity of said drainage notches in said ridge whereby said flowable, liquid drips from said product accumulating between said inner surface of said rim and said outer surface of said ridge flow into said interior liquid containment chamber of said cup.

3. The receptacle of claim 1 wherein said rim has a diameter greater than the diameter of said vertical, annular ridge.

4. The receptacle of claim 3 wherein the uppermost edge of said ridge is at least one-quarter inch below said uppermost edge of said rim.

5. The receptacle of claim 1 wherein said outwardly sloping rim is approximately one-inch wide and slopes outwardly at an angle of approximately 45° from said central vertical axis.

6. The receptacle of claim 2 wherein said multiplicity of said notches is four notches disposed at each quadrant of said annular ridge.

7. The receptacle of claim 1 wherein said receptacle has a composition selected from the group consisting of paper, plastic, styrofoam, and waxed paper.

8. The receptacle of claim 1 wherein said drainage notch is V-shaped.

* * * * *